United States Patent Office 2,747,108
Patented May 22, 1956

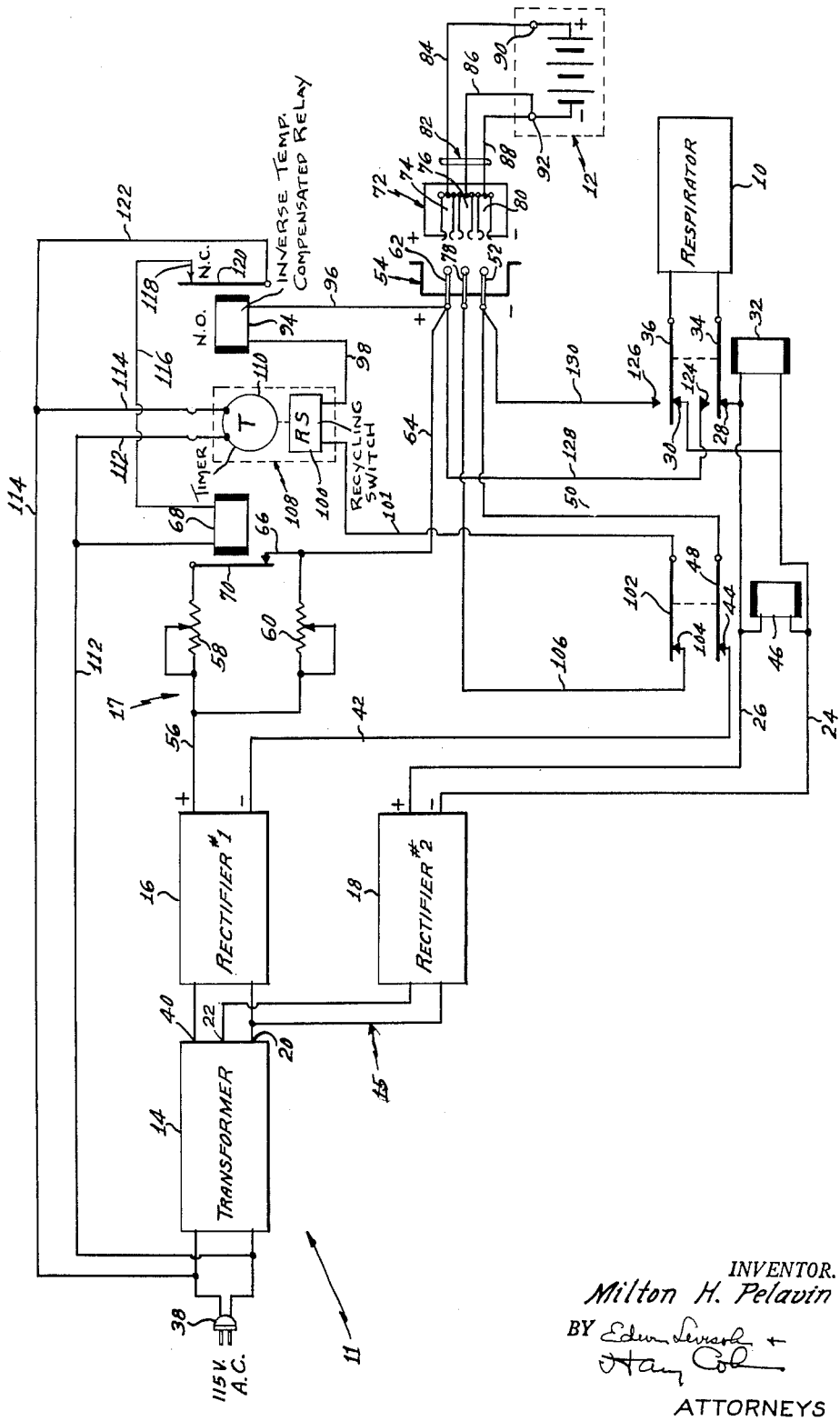

2,747,108

CONVERTIBLE ALTERNATING TO DIRECT CURRENT POWER SUPPLY AND BATTERY CHARGING MEANS FOR PORTABLE ELECTRICAL EQUIPMENT

Milton H. Pelavin, Brooklyn, N. Y., assignor to Conitech, Ltd., New York, N. Y., a corporation of New York Application August 20, 1953, Serial No. 375,374

11 Claims. (Cl. 307—66)

The present invention relates generally to power supplies and in particular to a combined rectified power supply and battery charger circuit.

An object of the present invention is the provision of an alternating current power supply which provides a direct current voltage output and which has a battery charging circuit whereby battery operated electrical apparatus may be connected to said direct current voltage output and the battery thereof may be connected to the charging circuit during the period that said apparatus operates from said direct current voltage supply.

In connection with the foregoing object, provision is made for a battery charging circuit which utilizes an inverse-temperature compensated voltage relay and, therefore, it is another object to provide for automatically resetting the relay when the battery is disconnected from the charging circuit.

Another object of the present invention is the provision of means for automatically resetting the inverse-temperature compensated voltage relay in the event of power line failure.

A further object is the provision of means for automatically switching the battery from the charging circuit to the electrical apparatus which is connected to the direct current voltage supply in the event of power line failure, or in the event of failure in the components of the rectified power supply circuit.

A still further object is the provision of an alternating current supply having provision to prevent interaction between a plurality of loads simultaneously connected thereto.

The above and other objects, features and advantages of the present invention will be fully understood from the following description considered in connection with the sole illustrative drawing herein which illustrates the best mode now contemplated by me for carrying out my invention, which drawing illustrates a schematic circuit diagram for a combined power supply and battery charging means pursuant to the present invention.

Referring now in detail to the single figure of the drawing herein, the reference numeral 10 diagrammatically indicates a unit of electrical apparatus or equipment which requires a direct current voltage supply, and the reference numeral 12 indicates a storage battery supply therefor. As presently constructed and used, the combined power supply and charging circuit of the present invention is used in connection with an artificial respirator of the general type shown in Patent No. 2,466,108 to T. C. Huxley, III, as well as in the copending application of said T. C. Huxley, Serial No. 295,181 filed June 24, 1952 and assigned to the assignee hereof, which illustrates a pumping apparatus for the respirator which can be operated by a direct current motor. A respirator of said type is convenient for portable use, for example, during transportation or movement of a patient who requires continuous use of the respirator, or when a patient is out of doors or away from a power line. Under such circumstances the respirator operates from a storage battery. However, where an alternating current power line is available, the respirator is operated by an alternating current power supply to provide a direct current voltage output therefor. It will be readily apparent that it is quite convenient to charge the storage battery while the respirator is being operated from the direct current voltage output and from the same circuit which provides said direct current voltage output. In addition, while the respirator is operating off the alternating current power line and its battery is being charged, as described, the present invention contemplates the provision of means to automatically connect the respirator to the battery for operation thereby in the event of failure of the alternating current power source or in any of the power supply components. However, while reference is made in the drawing and in the rescription to a respirator, it will be understood that a respirator is used herein purely for illustrative purposes and that the present invention is not limited to use with a respirator and can be used in connection with any type of electrical equipment, apparatus or component that can operate from a direct current voltage.

The combined battery charger and power supply apparatus of the present invention, generally indicated by the reference numeral 11, operates preferably from 115 volt A. C. source, being provided with the transformer 14, the secondary of which is connected to the rectifier 16 and the rectifier 18 so that said rectifiers are supplied in common by the transformer. The rectifier 18 provides. the rectified or direct-current voltage output supply for operating the electrical equipment 10, which, as previously indicated, may, by way of example, be constituted by the pump motor for a portable respirator, in the present use of the appparatus. The reference numeral 15 generally indicates the circuit for providing said direct current voltage output, which circuit includes said rectifier 18. It will be noted that only a portion of the voltage output of the transformer 14 is supplied to the rectifier 18, as indicated by the taps 20 and 22 so as to provide, in the present use of the apparatus 11, a 24 volt direct-current output at the rectifier 18, which is the required voltage for operating the motor of the respirator 10. Said output voltage of the rectifier 18 is applied through the wires 24 and 26 to the stationary contacts 28 and 30 of the relay 32 which is connected across said wires. In the energized condition of the relay 32, said contacts 28 and 30 are closed by the movable contact elements 34 and 36, respectively, of the relay 32, which elements are connected to the motor of the respirator unit 10. Consequently, it will be apparent that with the plug 38 connected to an outlet constituting a source of alternating current voltage, the rectifier 18 supplies the direct current voltage for operating the electrical apparatus 10.

As previously indicated, the rectifier 16 supplies the direct current charging voltage for the battery 12, the charging circuit being generally indicated by reference numeral 17. More specifically, it will be noted that the rectifier 16, as here shown, is connected across the full output of the transformer 14 as indicated by the taps 20 and 40, and it will be understood that, as now constructed the rectifier 16 provides a direct current voltage output of 30 volts. The negative output of the rectifier 16 is applied through the wire 42 to the stationary contact 44 of the relay 46, which relay is connected across the previously mentioned wires 24 and 26 which supply the output voltage of the rectifier 18 to the unit 10. The movable contact member 48 of the relay 46 is connected by the wire 50 to the negative terminal 52 of a receptacle 54. The positive output terminal of the rectifier 16 is connected by the wire 56 to the variable resistor or rheostat 58, which constitutes the high rate or high voltage charging control, and to the variable resistor or rheostat 60, which constitutes the low rate or low voltage charging control, of the battery charging circuit 17. The positive terminal 62 of the receptacle 54 is connected by the wire 64 to the stationary contact 66 of the relay 68, the function of which is hereinafter explained in detail. The low rate charging control 60 is connected to said wire 64, and the high rate charging control 58 is connected to the movable contact member 70 of said relay 68. A removable plug for the receptacle 54 is indicated by the reference numeral 72. Said plug is provided with a plug terminal 74 adapted to engage the receptacle terminal 52. A three wire cable 82 connects the plug 72 to the battery 12, it being noted that the plug terminal 74 is connected by the wire 84 to the positive terminal 90 of the battery, and the wires 86 and 88, for the plug terminals 76 and 80, respectively, are connected to the negative terminal 92 of the battery.

As is well known to those skilled in the art, the battery voltage, on the charging thereof, is related to the temperature of the battery. More specifically, the higher the battery temperature, the lower its voltage on charge, and, conversely, the lower the battery temperature, the higher its voltage on charge. It is also well known that there is an abrupt and sharp rise in the battery voltage at about the 80 to 90 per cent recharged state of the battery. Consequently, it is a common practice to protect the battery when it is about 80 to 90 per cent recharged, by changing the charging rate thereof, from the high to the low charge rate, by disconnecting the circuit through the high rate charging control and by continuing the charge under the control of the low rate charging control until the desired charge is obtained. In this connection, it is well known practice to utilize an inverse-temperature compensated voltage relay, known commercially as a TVR voltage relay, such as is fully illustrated and described in Patents Nos. 1,960,198 and 2,443,968. Such a relay is schematically indicated by the reference numeral 94. As the temperature rises, the operating voltage of the TVR relay 94 will lower, and as the temperature lowers, the operating voltage of the relay will rise. The relay 94 is set to operate within the range of the previously mentioned abrupt voltage rise which occurs during the charge of the battery, at the 80 to 90 per cent recharged state thereof. The relay 94 is connected in parallel with the battery 12 when the plug 72 thereof is inserted into the receptacle 54. More specifically, it will be noted that the relay 94 is connected through the wire 96 to the positive terminal 62 of the receptacle 54, and is connected to the negative terminal 92 by a circuit which includes the wire 98, the switch 100, the function of which is hereinafter described in detail, the wire 101, the movable contact member 102 of the previously identified relay 46, the stationary contact 104 thereof, the wire 106, the receptacle and plug contacts 78 and 76, and the wire 86 which is connected to the negative terminal 92 of the battery. Consequently, it will be apparent that the relay 94 is effectively connected across the terminals 90 and 92 of the battery. Another feature of a TVR relay is the fact that once it operates, it can be reset only by a momentary interruption of its coil circuit, which interruption must be at least one second long. As previously indicated, since the TVR voltage relay normally operates in the 80 to 90 per cent recharge state of the battery, so that the battery is thereafter continued to be charged at a low rate instead of a high rate, it will be apparent that if the battery is then left continuously on the low rate of charge, it would never reach a 100 per cent recharge state. In order to obviate this condition, it is a well known practice to operate the TVR relay under the control of a periodic recycling time switch which will reset the relay periodically for a short period of time during the completion of the battery charge. For example, the relay may be periodically reset after it operates to provide the low charging rate so that during one minute of each hour the battery will be receiving its high charging rate and during the remaining 59 minutes of each hour, the battery will be charging on its low rate of charge. Such a periodic recycling time switch, of well known construction, is schematically indicated at 108, and, as here shown, is constituted by a timer 110 and the previously identified switch 100 which is designated by the letters RS as a recycling switch. The timer 110 is operated by the alternating current power source, being connected to the plug 38 by the wires 112 and 114. It will be understood that the recycling switch 100 is a normally closed switch which can be operated with very small pressure and very small displacement, such as that sold under the trade name of "Micro-Switch," and is operated by the timer 110 so that it is open for one minute during each hour of operation, and is closed during the remaining 59 minutes of each hour of operation. In order to complete the circuit for opening the charging circuit at the right rate control 58 when the TVR relay 94 operates, provision is made for the previously identified relay 68, one side of which is connected to the wire 112 and through the latter to the plug 38, the other side of the relay 68 being connected through the wire 116 to the stationary contact 118 of the TVR relay 94, the movable contact member 120 of the TVR relay being connected by the wire 122 to the wire 114, and through the latter to the plug 38. Consequently, it will be apparent that during the normally closed engagement of the TVR relay contacts 118 and 120, which is the normal condition of said contacts before the TVR relay 94 operates within the previously described range of the abrupt voltage rise of the battery 12, it will be apparent that the relay 68 is in energized condition and in said condition retains the movable contact 70 in engagement with the contact 66 so that the battery is being subjected to its high charging rate. However, when the voltage at the battery terminals rises to the value at which the TVR relay operates, the contact 120 thereof disengages the contact 118 to open the circuit through the relay 68, which results in the disengagement of the contact 70, of the latter relay, from the stationary contact 66 to open the charging circuit through the high charging control 58. This discontinues the high rate of charge, it being noted that the charging circuit remains completed through the low rate charging control 60 and the charge continues at the low or trickle charging rate.

From the foregoing, it will be apparent that the rectifier 16 supplies the charging voltage for the battery 12 and the rectifier 18 supplies the operating voltage for the apparatus 10 when the latter is utilizing the alternating current line voltage as a power source. By using two separate rectifiers, a separate voltage magnitude is obtained for the apparatus 10 and a separate voltage magnitude is obtained for charging the battery 12. As previously indicated, as now constructed, the rectifier 18 supplies a 24 volt direct current supply for operating the motor of a respirator 10, and the rectifier 16 provides a higher supply, namely 30 volts, for charging the battery 12. In addition to the advantage of a higher voltage for such purpose, as described, the utilization of two separate rectifiers also provides for voltage regulation. In this connection, it will be apparent that the battery 12, when being charged, is electrically isolated from the apparatus 10 so that there is no interaction between said units and good voltage regulation is obtained.

Pursuant to another feature of the present invention, the TVR relay 94 is automatically reset whenever the battery 12 is disconnected from the charging circuit 17. More specifically, and as previously indicated, the coil of the TVR relay 94 is connected to the battery terminals 90 and 92 and is energized thereby, the battery serving to complete the circuit through the relay. Consequently, whenever the plug 72 is disconnected from the receptacle 54, for disconnecting the battery 12 from its charging circuit 17, the TVR relay 94 is de-energized, and therefore is automatically reset, so that when the plug 72 is thereafter reinserted in the receptacle 54 to recharge the battery, contacts 118 and 120 will be engaged so that the circuit through the secondary relay 68 is closed and the high rate charging control 58 will be in the charging circuit whereby the battery will be subjected to its high rate of charge. In addition to the foregoing, another feature of the invention resides in the fact that the TVR relay 94 is automatically reset in the event of failure in the alternating current line voltage. In this connection, it will be noted, as previously indicated, that the relay 46 is connected across the lines 24 and 26 from the rectifier 18 and when energized, closes the contacts 102 and 104. Upon failure of the alternating current line voltage, it will be apparent that the relay 46 will be de-energized to open the circuit through the coil of the TVR relay 94 by the disengagement of the contact 102 from the contact 104. This automatically resets the TVR relay 94 so that upon resumption of the line voltage, the battery will be charged at its high charging rate.

Pursuant to another feature of the present invention, the battery is automatically disconnected from its charging circuit 17 and connected to operate the electrical equipment 10, in the event of power failure in the line voltage, and also in the event of failure in the transformer 14 or in the rectifier 18. In this connection, it will be noted, as previously indicated, that the relay 32 is energized by the rectifier 18 and, when so energized, closes the contacts 28 and 30 thereof by means of the movable contacts 34 and 36, respectively. Said relay is also provided with the contacts 124 and 126. Contact 124 is connected by wire 128 to the positive terminal 62 of the receptacle 54 and, through the plug terminal 74, when the plug is engaged with the receptacle to the positive battery terminal 90. The contact 126 is connected through the wire 130 to the negative terminal 52 of the receptacle 54, and through the plug terminal 80 to the negative terminal 92 of the battery. It will be apparent that in the event of failure of the alternating current line voltage, the relay 32 will be deenergized whereupon the contacts 124 and 126 will be engaged by the movable contacts 34 and 36 respectively, so as to automatically connect the apparatus 10 to the terminals 62 and 52 of the receptacle 54, and through the companion terminals of the plug 72, to the negative and positive terminals of the battery 12. Similarly, in the event of failure of either the transformer 14 or the rectifier 18, the relay 32 will be de-energized to connect the apparatus 10 across the terminals of the battery 12.

Pursuant to another feature of the invention, the relay 46 also operates to disconnect the circuit between the rectifier 16 and the battery 12 in the event of failure in the alternating current line voltage. In this connection, as previously indicated, rectifier 16 is connected to the negative terminal 52 of receptacle 54 through wire 42; contacts 44 and 48 of relay 46 and wire 50. Said contacts are engaged when the relay is energized and when the relay is de-energized, as by failure of the line voltage, contacts 44 and 48 are disengaged. This prevents the battery from discharging a small reverse current through the rectifier 16. Also in the event of failure of rectifier 18 alone, the de-energization of relay 46 prevents rectifier 16 from supplying the current to the respirator as well as the charging current to the battery.

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent, is:

1. In an alternating current power supply, a transformer, a battery charging circuit and a direct current power supply circuit electrically independent of said charging circuit and energized in common therewith by said transformer, and rectifier means in each of said circuits, whereby a battery connected to said charging circuit and an electrical apparatus connected to said direct current power supply circuit will be electrically isolated from each other.

2. In an alternating current power supply circuit, a transformer, a battery charging circuit and a direct current power supply circuit energized in common by said transformer, and means operable upon failure of output from said direct current supply circuit to automatically disconnect a load therefrom and to connect the load to the battery under charge by said charging circuit.

3. In an alternating current power supply circuit, a transformer, a battery charging circuit and a direct current power supply circuit energized in common by said transformer, and means operable upon failure of output from said direct current supply circuit to automatically disconnect a load therefrom and to connect the load to the battery under charge by said charging circuit, said means being relay means energized by said direct current power supply circuit and operable when so energized to complete a circuit between the load and said direct current power supply circuit, said relay when de-energized being operable to complete a circuit between the load and the battery under charge.

4. In an alternating current power supply, a battery charging circuit and a direct current power supply circuit energized in common, means to connect a battery under charge to the output of said charging circuit, means to connect a load to the output of said direct current power supply circuit, said load connecting means being operable to connect said load automatically to the battery upon failure of said direct current power supply circuit, and means to interrupt the charging of the battery upon failure of said direct current power supply circuit, whereby to prevent said battery charging circuit from supplying both the battery and the load upon failure of said direct current power supply circuit.

5. An alternating current power supply as defined in claim 4, further characterized in the provision of a first rectifier means in said battery charging circuit and a second rectifier means in said direct current supply circuit, said load connecting means being relay means energized by said second rectifier means to connect the load to the output of said second rectifier means and operable when de-energized to connect the load to the battery, and said interrupting means being additional relay means energized by said second rectifier means and operable when de-energized to interrupt the circuit between said first rectifier means and the battery whereby to prevent the battery from discharging a reverse current through said first rectifier means upon failure of said common energization of said circuits.

6. In combination, a circuit for charging a storage battery from a power source, said circuit having means to selectively provide a higher or a lower battery charging rate, an inverse temperature-compensated relay connected in circuit with the battery for energization by the battery, means operable by said relay at a predetermined energization thereof to condition said selective means for said lower charging rate, and a disconnect means between said battery and each of said circuits for removing said battery from said charging circuit and for concomitantly de-energizing said relay means, whereby to reset the latter for conditioning said selective means for the higher charging rate upon reconnection of said battery.

7. In combination, a circuit for charging a storage battery from a power source, said circuit having means to selectively provide a higher or a lower battery charging rate, an inverse temperature-compensated relay connected in a circuit with the battery for energization by the battery, means operable by said relay at a predetermined energization thereof to condition said selective means for said lower charging rate, and a disconnect means between said battery and each of said circuits for removing said battery from said charging circuit and for concomitantly de-energizing said relay means, whereby to reset the latter for conditioning said selective means for the higher charging rate upon reconnection of said battery, said selective charging rate means including a first resistor connected in said charging circuit, a second resistor, a second relay connected in parallel circuit with said charging circuit and having contacts which operate upon energization of said second relay to connect said second resistor in parallel with said first resistor to provide said high charging rate, said first relay having contacts which normally complete the circuit for said second relay, and said latter contacts operating to interrupt said second relay circuit upon said predetermined energization of said first relay, whereby to disconnect said second resistor to provide said low charging rate.

8. In combination, a circuit for charging a storage battery from a power source, said circuit having means to selectively provide a higher or a lower battery charging rate, an inverse temperature-compensated relay connected in circuit with the battery for energization by the battery, means operable by said relay at a predetermined energization thereof to condition said selective means for said lower charging rate, said selective charging rate means including a first resistor connected in said charging circuit, a second resistor, a second relay connected in parallel circuit with said charging circuit and having contacts which operate upon energization of said second relay to connect said second resistor in parallel with said first resistor to provide said high charging rate, said first relay having contacts which normally complete the circuit for said second relay, and said latter contacts operating to interrupt said second relay circuit upon said predetermined energization of said first relay, whereby to disconnect said second resistor to provide said low charging rate.

9. In combination, a circuit for charging a storage battery from a power source, said circuit having means to selectively provide a higher or a lower battery charging rate, an inverse temperature-compensated relay connected in circuit with the battery for energization by the battery, means operable by said relay at a predetermined energization thereof to condition said selective means for said lower charging rate, a second relay connected to said power source through a circuit independent of said charging circuit and normally energized by said power source, and said second relay having contacts in circuit between said first mentioned relay and said battery which contacts are closed in the energized condition of said second relay, whereby to open the energizing circuit for said first relay upon failure of said power source for conditioning said charging circuit for the higher charging rate upon resumption of said power source.

10. In an alternating current power supply, a circuit for charging a battery, a direct current power supply circuit, said charging circuit having means to selectively provide a higher or a lower battery charging rate, an inverse temperature-compensated relay connected in circuit with the battery for energization by the battery, means operable by said relay at a predetermined energization thereof to condition said selective means for said lower charging rate, and a second relay connected in said direct current power supply circuit for energization thereby, and said second relay having contacts in circuit between said first mentioned relay and said battery which contacts are closed in the energized condition of said second relay, whereby to open the energizing circuit for said first relay upon failure of said direct current power supply circuit for conditioning said charging circuit for the higher charging rate upon resumption of said direct current power supply circuit.

11. In combination, a circuit for charging a storage battery from a power source, said circuit having means to selectively provide a higher or a lower battery charging rate, an inverse temperature-compensated relay connected in circuit with the battery for energization by the battery, means operable by said relay at a predetermined energization thereof to condition said selective means for said lower charging rate, a second relay connected to said power source through a circuit independent of said charging circuit and normally energized by said power source, and said second relay having contacts in circuit between said first mentioned relay and said battery which contacts are closed in the energized condition of said second relay, whereby to open the energizing circuit for said first relay upon failure of said power source for conditioning said charging circuit for the higher charging rate upon resumption of said power source, said charging circuit including a rectifier in circuit with said battery and said second relay having additional contacts in circuit between the rectfier and the battery which complete said circuit in the energized condition of said second relay, whereby said additional contacts are operable to open the circuit between the battery and rectifier upon failure of said power source.

References Cited in the file of this patent

UNITED STATES PATENTS

| Re. 18,516 | Beetem | July 12, 1932 |
| Re. 19,948 | Beetem | Feb. 11, 1936 |
| 1,786,280 | Woodbridge | Dec. 23, 1930 |
| 1,833,349 | Beetem | Nov. 24, 1931 |
| 1,865,595 | Spangler | July 5, 1932 |
| 1,882,472 | Beetem | Oct. 11, 1932 |
| 1,882,473 | Beetem | Oct. 11, 1932 |
| 1,960,198 | Beetem | May 22, 1934 |
| 2,000,189 | Power | May 7, 1935 |
| 2,012,903 | Beetem | Aug. 27, 1935 |
| 2,062,274 | Rees | Nov. 24, 1936 |
| 2,102,141 | Wagar | Dec. 14, 1937 |
| 2,104,602 | Agnew et al. | Jan. 4, 1938 |
| 2,139,330 | Gilson | Dec. 6, 1938 |
| 2,322,955 | Perkins | June 29, 1943 |
| 2,349,685 | Trucksess | May 23, 1944 |
| 2,443,968 | Swing | June 22, 1948 |
| 2,466,108 | Huxley | Apr. 5, 1949 |
| 2,519,650 | Hamilton | Aug. 22, 1950 |

FOREIGN PATENTS

| 405,427 | Italy | Aug. 11, 1943 |